(12) United States Patent
Huddleston

(10) Patent No.: US 7,219,914 B2
(45) Date of Patent: May 22, 2007

(54) TRAILER JACK AND METHOD

(75) Inventor: Rick Huddleston, Gassville, AR (US)

(73) Assignee: Wood Manufacturing, Flippin, AR (US)

( * ) Notice: Subject to any disclaimer, the term of this patent is extended or adjusted under 35 U.S.C. 154(b) by 104 days.

(21) Appl. No.: 10/827,999

(22) Filed: Apr. 19, 2004

(65) Prior Publication Data

US 2004/0262882 A1    Dec. 30, 2004

Related U.S. Application Data

(60) Provisional application No. 60/467,664, filed on May 1, 2003.

(51) Int. Cl.
*B60D 1/66*    (2006.01)
*B60S 9/14*    (2006.01)

(52) U.S. Cl. .............. 280/475; 280/763.1; 454/420

(58) Field of Classification Search .............. 280/475, 280/763.1; 254/420
See application file for complete search history.

(56) References Cited

U.S. PATENT DOCUMENTS

| | | | | |
|---|---|---|---|---|
| 2,196,510 A | * | 4/1940 | Vutz | 254/420 |
| 2,205,436 A | * | 6/1940 | Richards | 254/420 |
| 2,388,308 A | * | 11/1945 | Court | 280/763.1 |
| 2,627,424 A | | 2/1953 | Chapin | |
| 2,672,318 A | * | 3/1954 | Lee | 254/420 |
| 2,784,857 A | | 3/1957 | Duffy | |
| 2,784,985 A | * | 3/1957 | Schnell | 254/420 |
| 2,851,250 A | * | 9/1958 | Hansen | 254/420 |
| 3,025,985 A | * | 3/1962 | Crawford | 414/537 |
| 3,175,710 A | | 3/1965 | Kistner | |
| 3,181,891 A | | 5/1965 | Moats | |
| 3,314,692 A | * | 4/1967 | Karns | 280/475 |
| 3,325,206 A | * | 6/1967 | Carlson | 296/173 |
| 3,405,955 A | * | 10/1968 | Schuler | 280/475 |
| 3,425,714 A | | 2/1969 | Morris | |
| 3,448,998 A | | 6/1969 | Abolins | |
| 3,944,259 A | | 3/1976 | Miller | |
| 3,997,191 A | | 12/1976 | Morgan | |
| 4,113,274 A | * | 9/1978 | Vahrenkamp | 280/475 |
| 4,169,579 A | | 10/1979 | Moll | |
| 4,623,125 A | | 11/1986 | Ebey | |

(Continued)

FOREIGN PATENT DOCUMENTS

GB    2 080 762 A    2/1982

OTHER PUBLICATIONS

Champion Trailers Product Catalog, www.Champion Trailers®.com, pp. 1, 42, 43 (2004).
ShoreLand'r Trailer Accessories & Replacement Parts Catalog, Midwest Industries, Inc., pp. 2-5 (2004).

(Continued)

*Primary Examiner*—Lesley D. Morris
*Assistant Examiner*—Daniel Yeagley
(74) *Attorney, Agent, or Firm*—Merchant & Gould P.C.

(57)    ABSTRACT

A trailer for coupling with a motor vehicle including a frame with at least a pair of wheel supporting the rear and a trailer support for supporting the front. The trailer support is pivotably mounted within a central member extending longitudinally along the centerline of the trailer. The trailer support pivots from a support position to a stowed position where the trailer support is within the central member of the trailer. A method of using a central member mounted trailer support to support the front end of the trailer when coupling or uncoupling the trailer from a motor vehicle.

15 Claims, 14 Drawing Sheets

U.S. PATENT DOCUMENTS

| | | | |
|---|---|---|---|
| 4,802,685 A | | 2/1989 | Godbersen |
| 5,040,937 A | | 8/1991 | Godbersen |
| 5,087,063 A | * | 2/1992 | Merrill, Jr. .................. 280/475 |
| D390,503 S | | 2/1998 | Gleason et al. |
| 6,267,357 B1 | | 7/2001 | Ebey et al. |
| 6,302,381 B1 | | 10/2001 | Roll |
| 6,446,937 B1 | | 9/2002 | Straw, Sr. et al. |
| 6,848,702 B1 | * | 2/2005 | Williams .................... 280/475 |
| 2003/0042707 A1 | | 3/2003 | McCarty |

OTHER PUBLICATIONS

Photograph of TIEZR 30-34 Model, EZ Loader Boat Trailers, Inc., 1 pg, date unknown.

Photograph of TEZP 20-22 Model, EZ Loader Boat Trailers, Inc., 1 pg, date unknown.

Photograph of EZL 17-20 Model, EZ Loader Boat Trailers, Inc., 1 pg, date unknown.

Photograph of EZ 19-22 Model, EZ Loader Boat Trailers, Inc., 1 pg, date unknown.

* cited by examiner

TRAILER JACK AND METHOD

CROSS REFERENCE TO RELATED APPLICATION

This application claims the benefit of U.S. Provisional Application Ser. No. 60/467,664 filed May 1, 2003 of which application is herein incorporated by reference in its entirety.

TECHNICAL FIELD

The present invention relates generally to trailer jacks. More particularly, the present invention relates to jacks for boat trailers.

BACKGROUND

Boat trailers are typically equipped with a front tongue assembly at which a coupler is mounted. The coupler is adapted to couple with a ball of a trailer hitch. To couple the coupler to the ball, it is necessary to orient the coupler above the ball, and then lower the coupler onto the ball. When a boat is mounted on the trailer, lifting the front of the trailer so as to orient the coupler above the ball of a trailer hitch is a difficult task due to the weight of the boat. To overcome this problem, jacks have been mounted at the front of boat trailers.

FIG. 1 shows a prior art trailer jack configuration. The configuration includes a jack 20 pivotally connected to one side of a trailer 22. The pivotal connection allows the jack to be pivoted from a stowed position (not shown) to a deployed position (shown in FIG. 1). When in the deployed position, a wheel 26 of the jack 20 engages the ground. By turning a handle 28, portions of the jack move telescopically relative to one another to raise the front of the trailer 22. The wheel 26 allows the front of the trailer 22 to be readily moved so as to align a coupler 30 of the tongue assembly over a ball of a trailer hitch.

The side mount configuration of the jack 20 presents several problems. First, the jack projects laterally from the trailer and is exposed thereby increasing the likelihood of inadvertently bumping the lift or interfering with the ability to swing the tongue assembly to a storage position. Also, the offset configuration of the lift causes the trailer frame to torque or twist as the frame is lifted.

SUMMARY

The present invention relates to a trailer for towing behind a motor vehicle. The trailer includes a tongue assembly at a front end of the trailer. The tongue assembly includes a coupler for coupler to the motor vehicle and a hollow central member extending longitudinally along a centerline of the trailer from the coupler toward a rear of the trailer. The central member includes a second end opposite the coupler. A port beam and a starboard beam extend longitudinally between the tongue assembly and the rear of the trailer. The port and starboard beams include forward ends connected to the tongue assembly at point forward from the second end of the central member. At least one pair of wheels supports the rear of the trailer. A cross beam extends transversely between the port and starboard beams and is connected to the second end of the central member. A trailer support is mounted within the central member between the crossbeam and the forward ends of the port and starboard beams. The trailer support is pivotable between a generally vertical support engaging the ground to support the front of the trailer, and a generally horizontal stowed position within the central member.

The present invention further relates to a method of attaching a trailer to a tow vehicle. The method includes providing a tow vehicle with a trailer coupling and a trailer with a mating coupling on a tongue assembly at a front of the trailer. The tongue assembly includes a central member extending longitudinally along a centerline of the trailer and a trailer support pivotably mounted to the central member. The trailer support is provided in a support position supporting the front of the trailer and the trailer also including a pair of wheels supporting a rear of the trailer. The trailer coupling of the tow vehicle is positioned adjacent the mating coupling of the trailer. The trailer coupling and the mating coupling are attached to each other and the trailer support is pivoted into a stowed position within the central member.

The present invention relates also to a tongue assembly for a detachable motor vehicle trailer. The tongue assembly includes a central member mounted on a centerline of the trailer and a coupler for connecting the trailer to the motor vehicle. The central member is generally square in cross-section. A trailer jack is pivotably mounted to the central member and pivotable between a generally vertical support position and a generally horizontal stowed position with the trailer jack generally contained within the central member. The trailer jack also includes a pair of brackets adjacent an axis of pivot and a lower end with a caster wheel mounted. At least a portion of the caster wheel is within the central member when the trailer jack is in the stowed position. The central member includes a releasable latch configured to engage a first opening in one of the brackets of the trailer jack and releasably lock the trailer jack in the support position. The latch is also configured to engage a second opening of the same bracket and releasably lock the trailer jack in the stowed position within the central member.

Another inventive aspect of the present disclosure relates to a lift for a trailer that is mounted at a location between the left and right boundaries defined by a frame of the trailer. In a preferred embodiment, the jack is mounted at a longitudinal centerline of the trailer.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
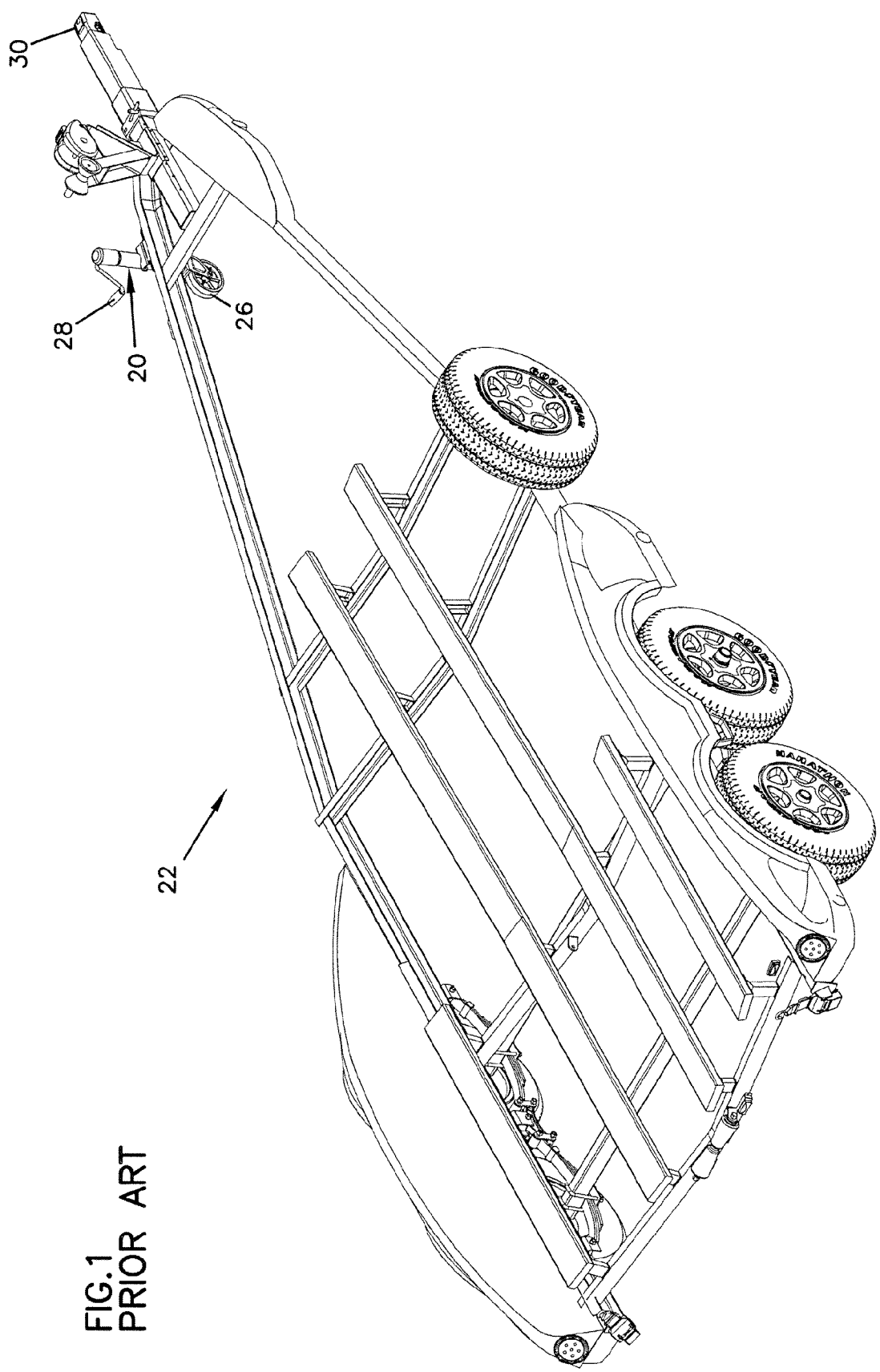
FIG. 1 shows a prior art trailer jack mounted on a trailer.
Figure 3:
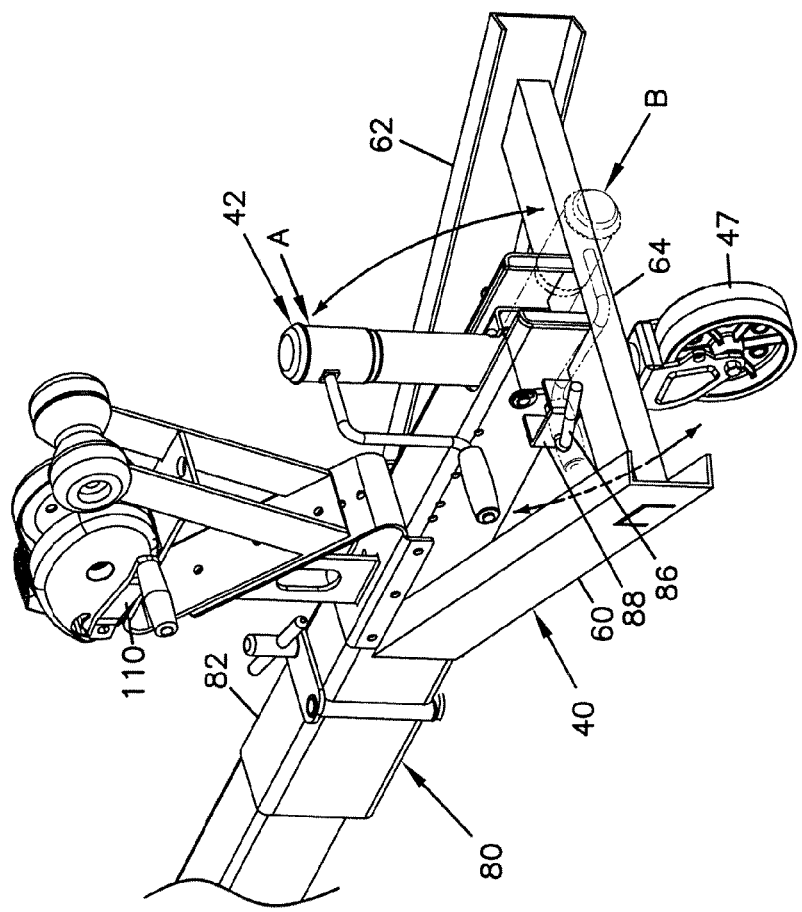
FIG. 3 is a prospective view showing a trailer jack having inventive features that are examples of inventive aspects in accordance with the principles of the present disclosure.
Figure 2:
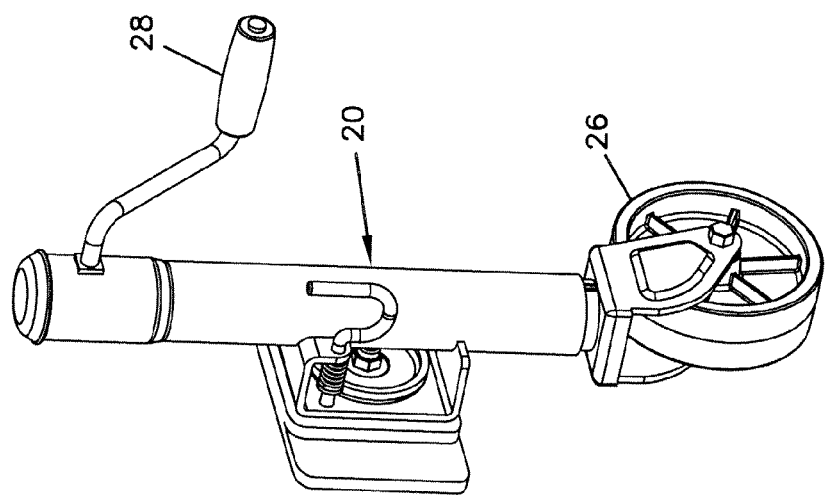
FIG. 2 shows a trailer jack of FIG. 1 separated from the trailer.
Figure 4:
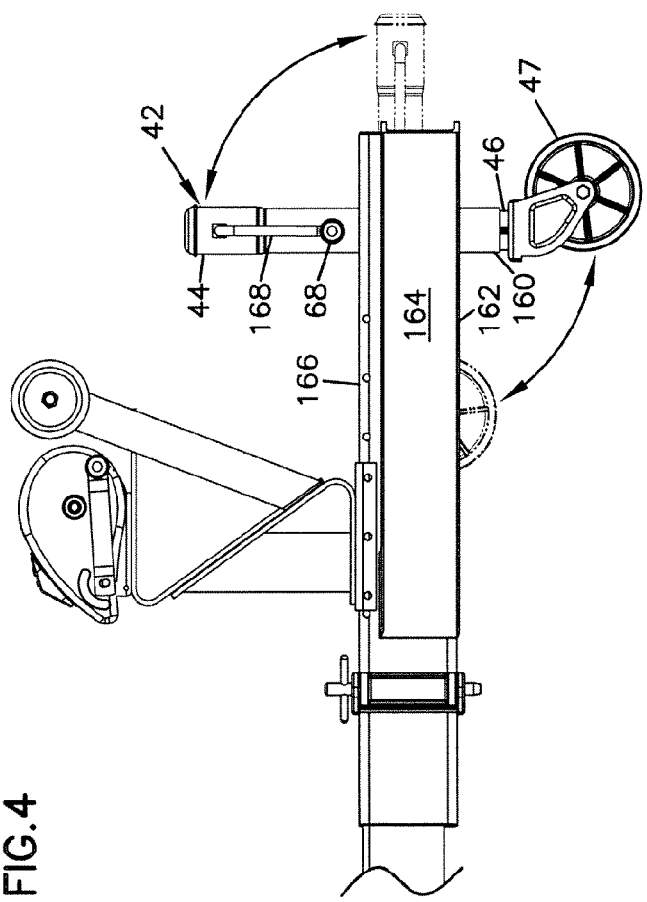
FIG. 4 is side view of the trailer jack of FIG. 3.

FIGS. 3 and 4 show a front portion of a trailer 40 having a trailer lift 42 having inventive features that are examples of inventive aspects in accordance with the principles of the present disclosure. As shown in FIGS. 3 and 4, a front tongue portion and a rear portion of the trailer are cut away. It will be appreciated that the front tongue typically is equipped with a coupler as shown in FIG. 1 for coupling to a hitch structure such as a ball of a trailer hitch. The rear portion of the trailer is supported at least by a pair of wheels and is adapted for holding a boat. The jack 42 is positioned at a longitudinal centerline of the trailer 40 and is pivotally moveable relative to the trailer between a substantially vertical, deployed or support position A and a substantially horizontal, stowed position B.

Referring to FIG. 4, the jack 42 includes an outer tube 44 telescopically connected to an inner tube 46. A known drive mechanism is housed within the outer and inner tubes 44, 46. The drive mechanism is actuated by handle 68 and causes the outer and inner members 44, 46 to either move telescopically apart or telescopically together dependent upon the direction the handle 68 is rotated. In one embodiment, the drive mechanism is a screw drive as disclosed in U.S. Pat. No. 6,302,381, which is hereby incorporated by reference in its entirety. However, it will appreciated that any type of drive mechanism or any other type of lift configuration could also be used.

It will be appreciated that when the outer and inner tubes 44, 46 extend telescopically apart, the front tongue region of the trailer is lifted. By contrast, when the outer and inner tubes 44, 46 move telescopically toward one another, the front tongue region of the trailer is lowered. A caster wheel 47 is connected to the lower end of the inner tube 46.

Referring still to FIGS. 3 and 4, the trailer includes port and starboard frame members 60 and 62 interconnected by a cross member 64. Preferably, the cross member 64 is welded between the port and starboard members 60, 62. For example, as shown in FIG. 3, the port and starboard frame members 60, 62 have generally C-shaped cross sections, and the cross member 64 is shown secured to lower flanges of the frame member 60, 62.

Figure 7:
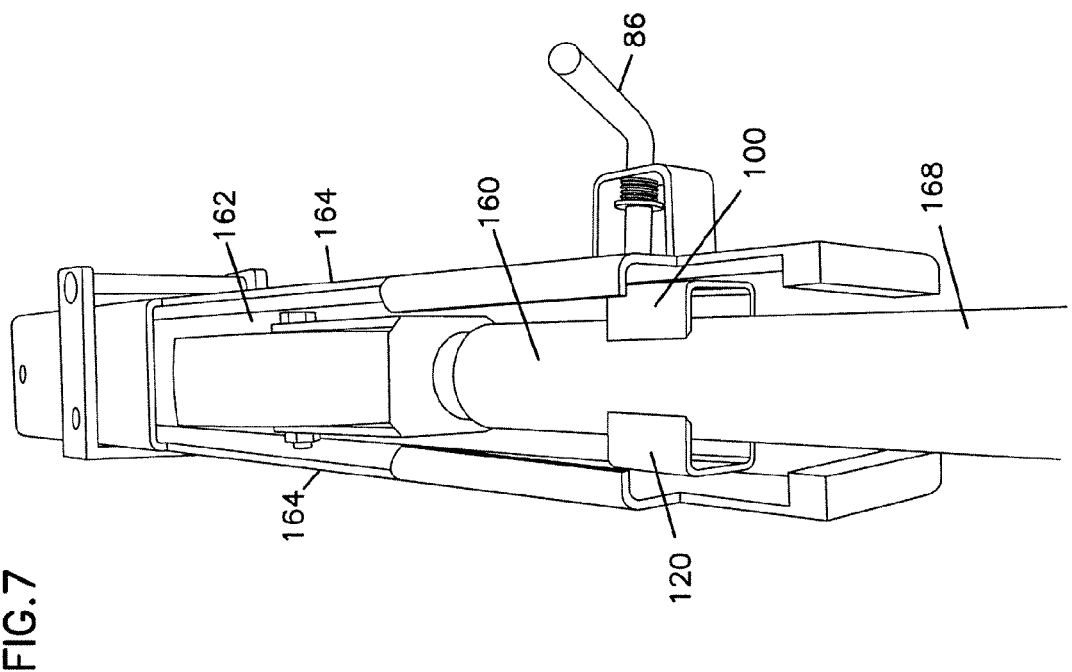
FIG. 7 is a bottom view of the jack of FIG. 3 showing the jack stowed within the tongue assembly.
Figure 6:
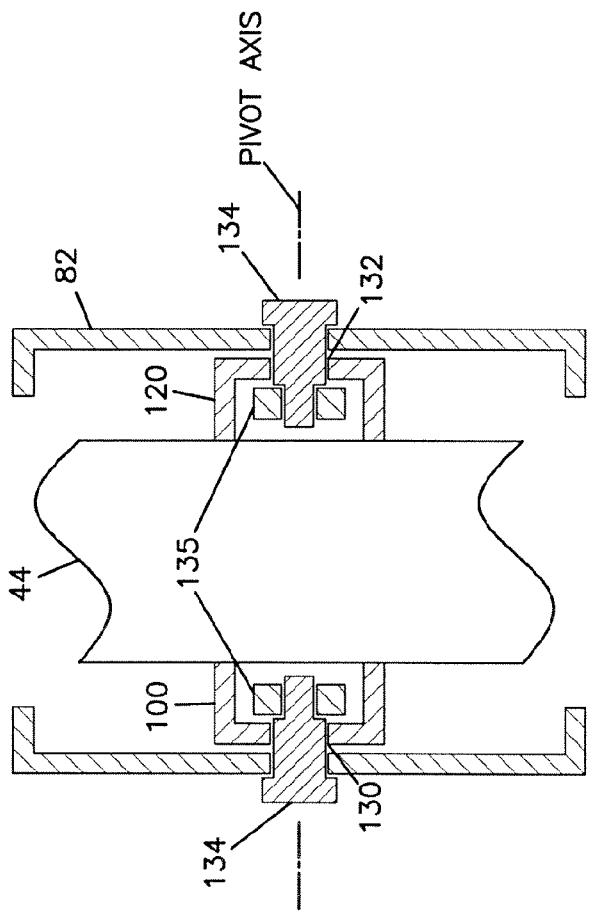
FIG. 6 is a cross-sectional view of the jack of FIG. 3 taken through the pivot axis.
Figure 8A:
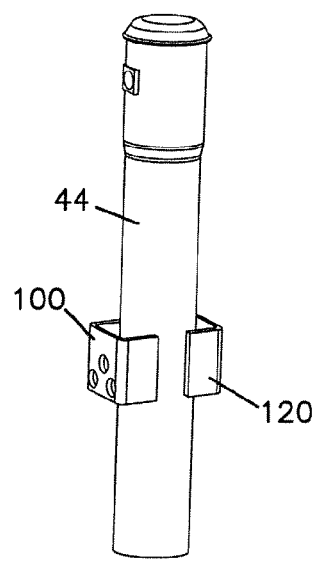
FIGS. 8A–8E show various views of an outer tube of the trailer jack of FIG. 3.
Figure 8B:
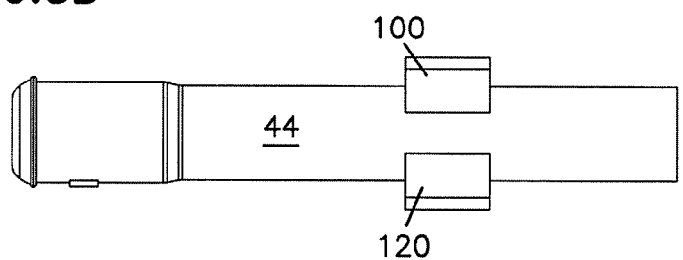
Figure 8C:
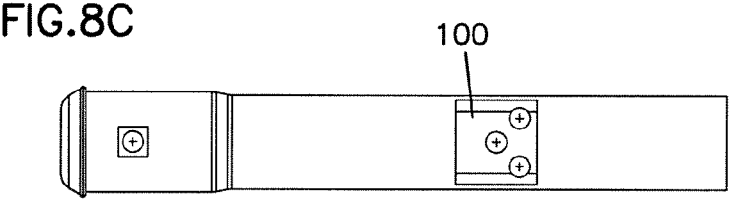
Figure 8D:
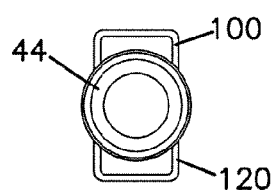
Figure 8E:
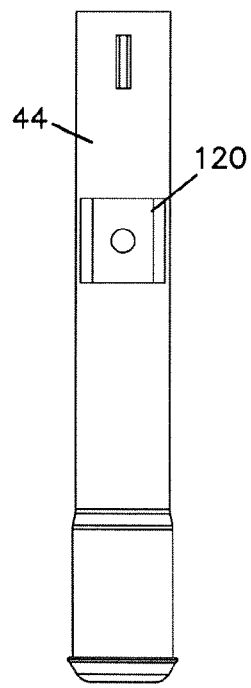
Figure 9A:
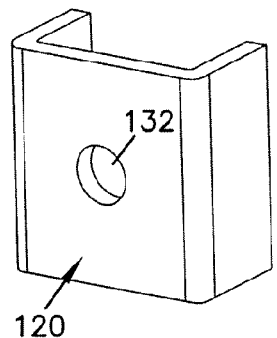
FIGS. 9A–9D show various views of a latch bracket of the trailerjack of FIG. 3.
Figure 9B:
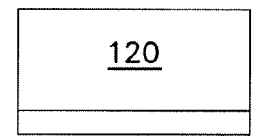
Figure 9C:
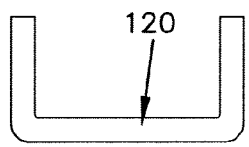
Figure 9D:
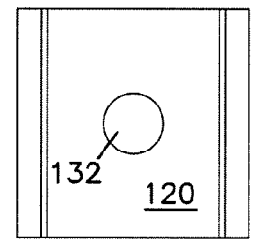
Figure 10A:
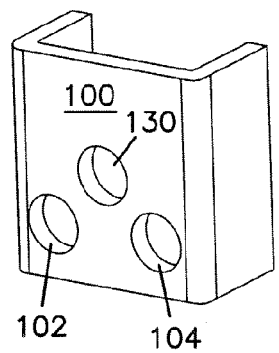
FIGS. 10A–10D show various views of a latch side mounting bracket of the trailer jack of FIG. 3.
Figure 10B:
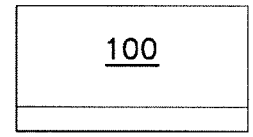
Figure 10C:
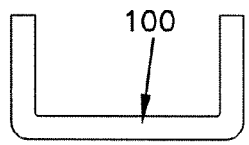
Figure 10D:
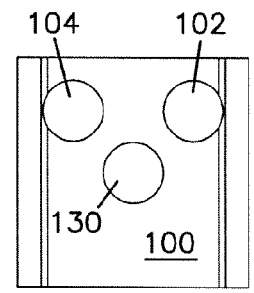
Figure 11A:
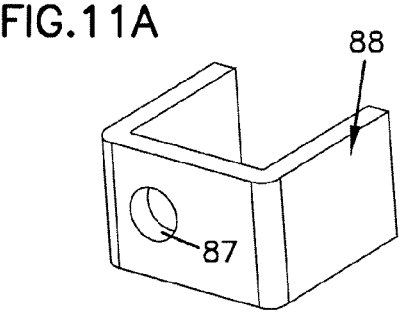
FIGS. 11A–11D show various views of a non-latch side mounting bracket of the trailer jack of FIG. 3.
Figure 11B:
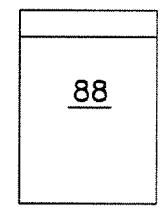
Figure 11C:
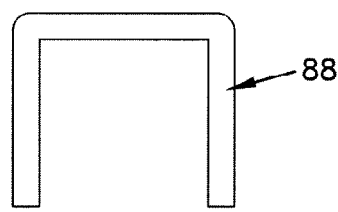
Figure 11D:
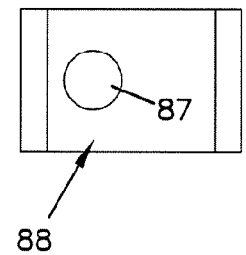

The trailer 40 also includes a central tongue assembly 80 that extends along a central longitudinal axis of the trailer. The tongue assembly 80 includes a square tube or central member 82 having a back end 63 affixed to the cross member 64 and sides affixed to the port and starboard frame member 60, 62 at a point forward of cross member 64. The square tube 82 has a square cross section. Adjacent the cross member 64, top and bottom sides of the square tube 82 are cut away to provide clearance for allowing the jack 42 to pivot from the deployed orientation A to the stowed orientation B. Thus, when the jack 42 is in the stowed orientation, a central longitudinal axis of the jack 42 extends within and generally parallel to the square tube member 82. A conventional winch 110 is mounted on the top side of the square tube 82. A coupler for coupling to a trailer hitch is positioned at the front of the tongue assembly 80. A lower portion 160 of the jack 42 extends below square tube 82 when jack 42 is in position A. This lower portion 160 is within a portion of square tube 82 having an open bottom 162, opposing sides 164 and a top 166 covering the lower portion 160 (see FIGS. 4 and 7). An upper portion 168 of jack 42 extends above square tube 82 in position A and is within an open topped portion of square tube 82 and partially extends beyond back end 63 of square tube 82 in position B.

Figure 5:
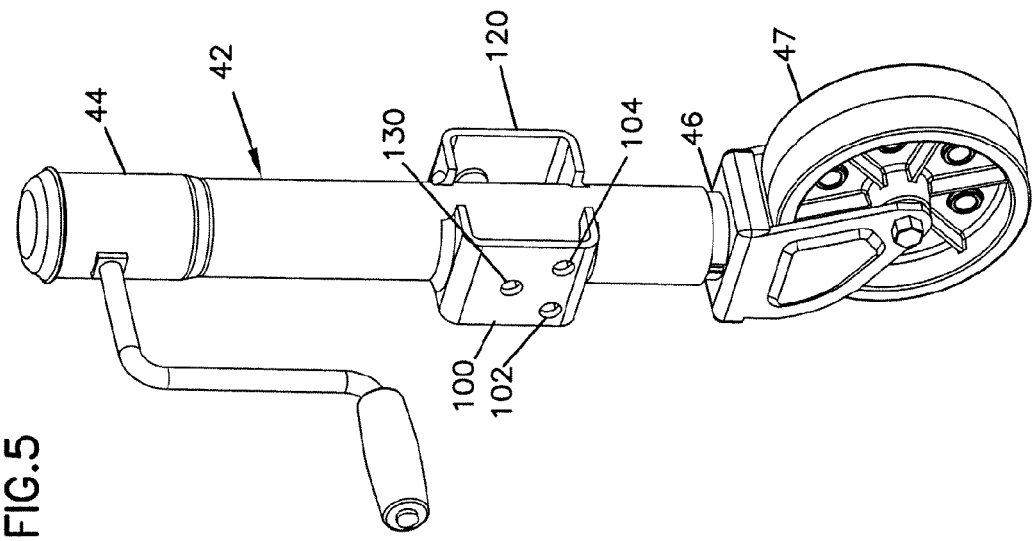
FIG. 5 is a perspective view of the jack of FIG. 3 in isolation from the trailer.
Figure 13:
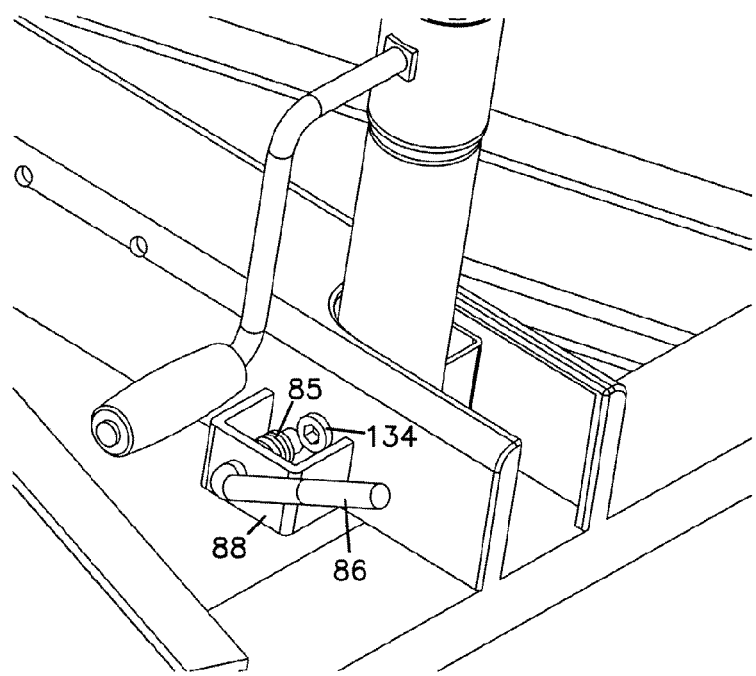
FIG. 13 is a perspective view showing the latch of the jack of FIG. 3.
Figure 14:
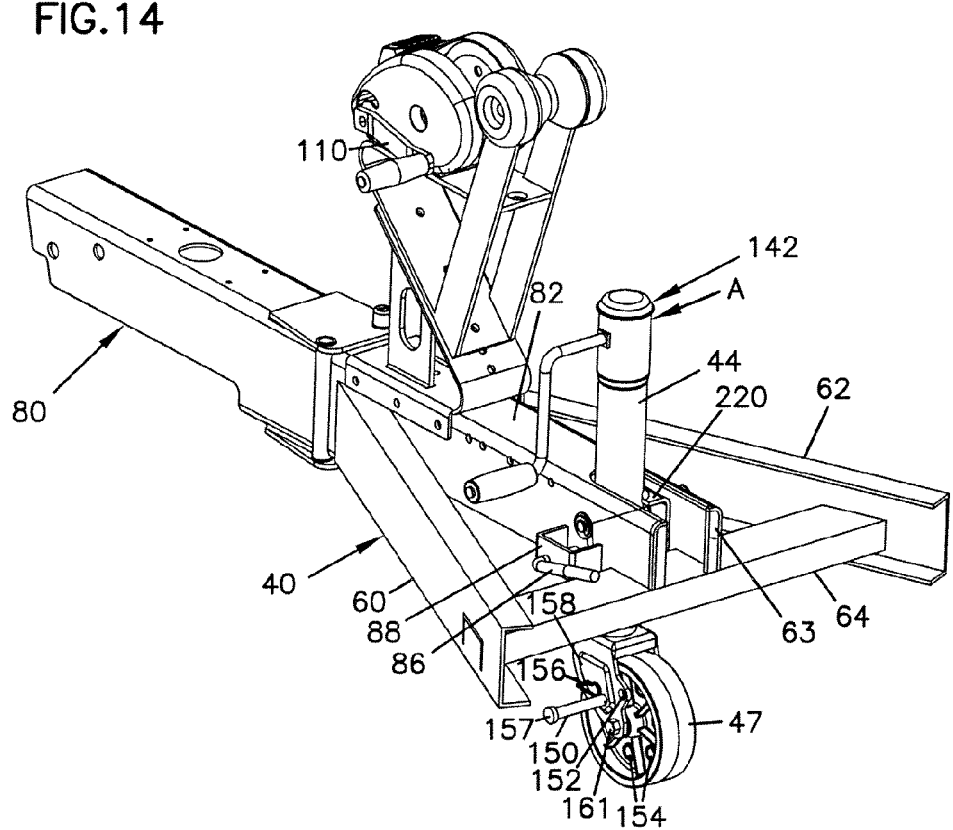
FIG. 14 is a perspective view of an alternative embodiment of a tongue assembly for a trailer including a trailer jack according to the present invention, with an exploded view of a pin inserted through a caster wheel mounted to a lower end of the trailer jack.
Figure 15:
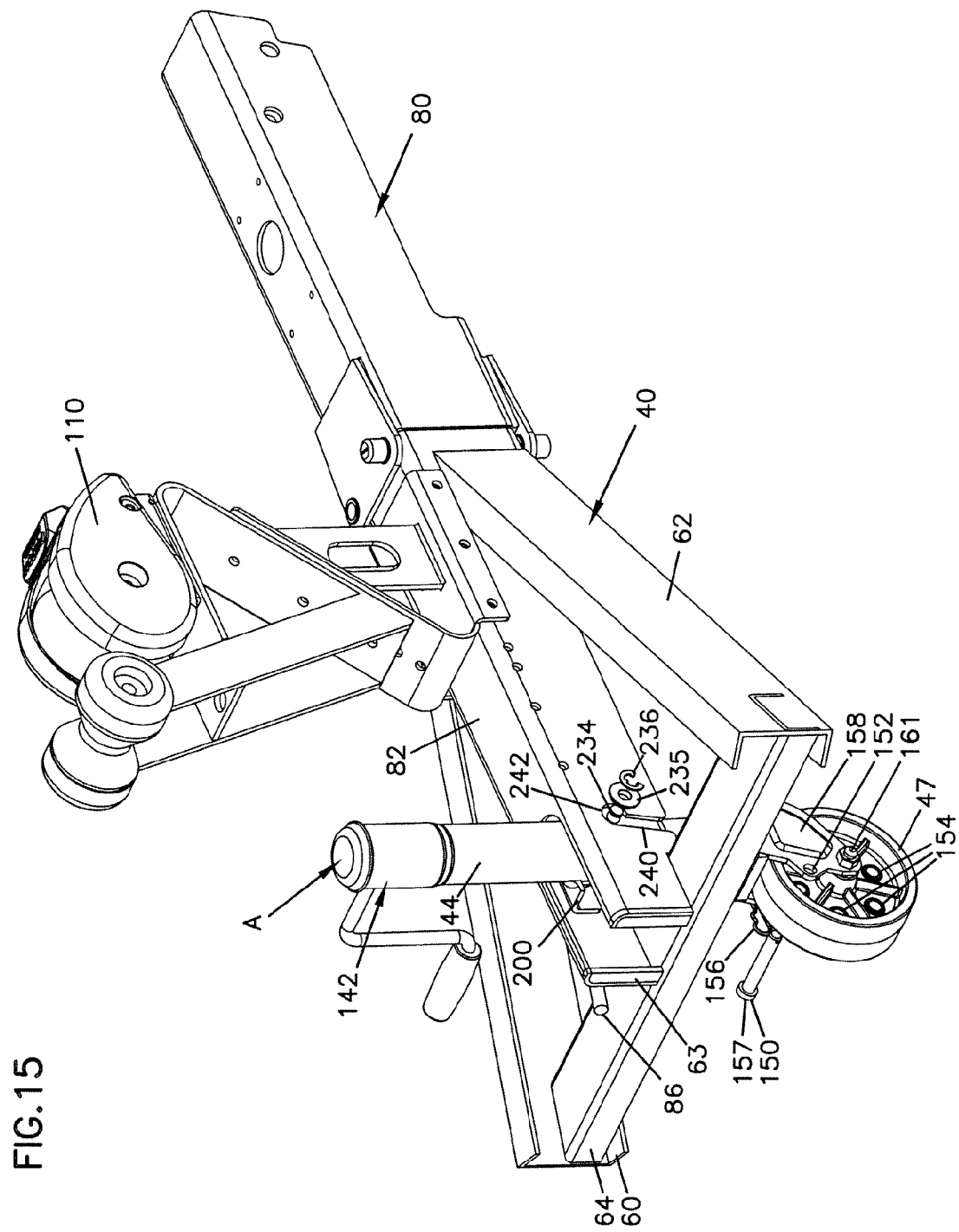
FIG. 15 is a second perspective view of the tongue assembly of FIG. 14, with a pivot pin restraint arrangement on a first side of the central member exploded.

Referring to FIG. 3, the jack 42 also includes a latch 86 for latching the jack 42 in either the deployed orientation A or the stowed orientation B. The latch 86 is secured to the side of the square tube 82 by a latch bracket 88. By pulling the latch 86 outwardly from the bracket 88, the latch disengages from a latch side bracket 100 (see FIGS. 5 and 7) welded to the outer tube 44 such that the jack 42 can be pivoted between the stowed and deployed orientations. A spring 85 (see FIG. 13) preferably biases the latch 86 to the locked position. When the jack 42 is locked in the deployed, vertical position, the latch 86 fits within an opening 102 (see FIG. 5) defined by the latch side mounting bracket 100. When the jack 42 is locked in the stowed orientation, the latch 86 slides within opening 104 (see FIG. 5) defined by the latch side mounting bracket 100.

Figure 12:
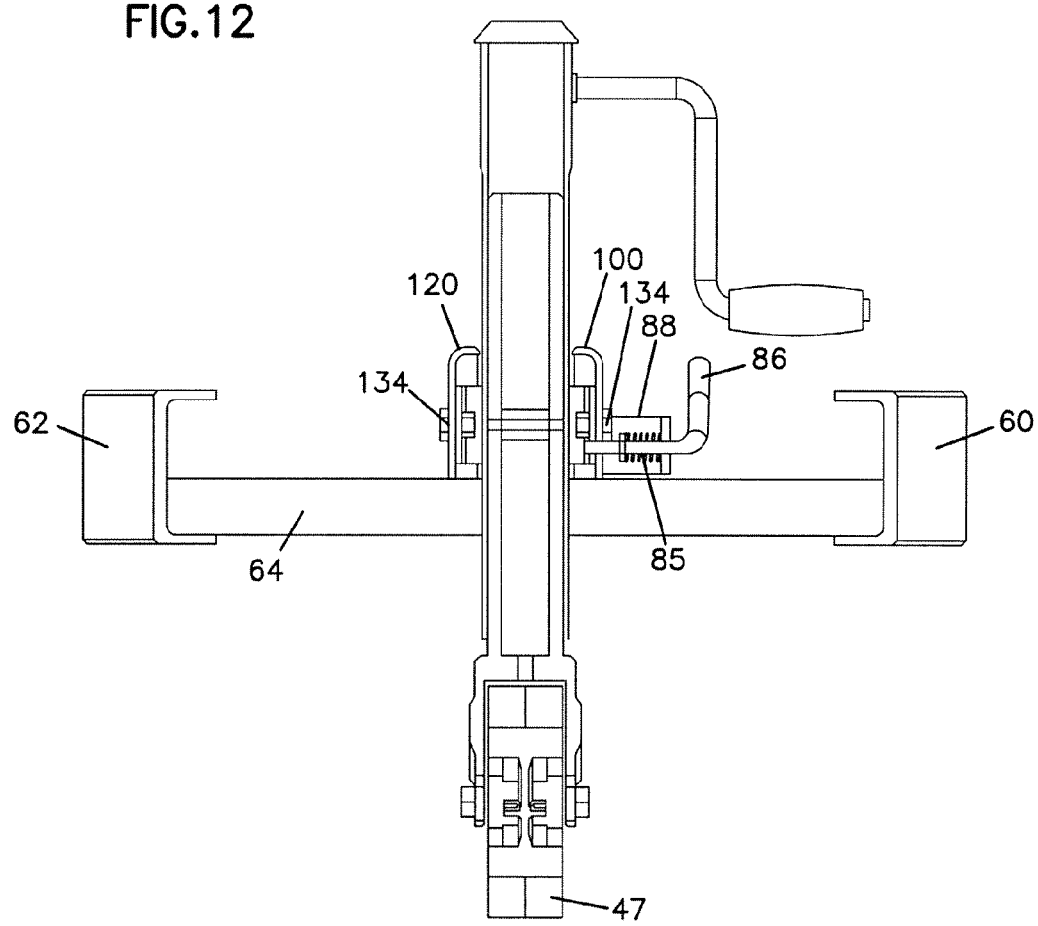
FIG. 12 is a cut-away view of the jack of FIG. 3.

Referring to FIGS. 5, 6, 7 and 8A–8E, the bracket 100 is welded to the latch side of the jack 42, and another bracket 120 is welded to the opposite side of the jack 42. The brackets 100, 120 define coaxially lined openings 130, 132 (see FIG. 6) centered about a pivot axis of the jack 42. The jack 42 is secured to the rectangular tube 82 by shoulder bolts 134 (see FIGS. 6, 12 and 13) that extend through openings defined through the sides of the rectangular tube 82. The shoulder bolts 134 align along the pivot axis of the jack 42. Threaded ends of the shoulder bolts extend through the openings of the brackets 100, 120. The threaded ends of the shoulder bolts are threaded onto nuts 135 positioned between the brackets 100, 120 and the outer tube 44. The nuts abut against the shoulders of the shoulder bolts to prevent the brackets 100, 120 from being clamped against the sidewalls of the square tube 82.

FIGS. 9A–9D show the bracket 120. FIGS. 10A–10D show the bracket 100. FIGS. 11A–11D show the latch bracket 88, including an opening 87 for latch 86 to extend through.

Referring now to FIGS. 14 to 23, FIGS. 14 and 15 show tongue assembly 80 of trailer 40 with an alternative embodiment of a trailer support 142, with trailer support 142 in the support position A. As shown in FIGS. 3 and 4, above, trailer support 142 can be pivoted to the stowed position B, within square tube of central member 82. Trailer support 142 is pivotably mounted to central member 82 by a pair of pins 234 secured within openings in the central member by a two-step washer 235 and a circlip 236 (shown in greater detail in FIGS. 15 to 18, below). Other than the nature of the mounting to central member 82 of tongue assembly 80 and the mounting of caster wheel 47 (described more fully below), jack 42 and trailer support 142 are generally identical.

Pins 234 with head 238 are mounted to a pair of opposing brackets 200 and 220. Trailer support 142 may also include a caster wheel 47 mounted within a wheel bracket 158. Wheel 47 rotates about an axis 161 to permit maneuvering and positioning of tongue assembly 80 and trailer 40 to facilitate coupling of trailer 40 to a motor vehicle with a mating coupler. Wheel bracket 158 includes a pair of opposing openings 152 and wheel 47 includes a plurality of openings 154 which may be coaxially aligned with openings 152. Alignment of openings 152 and 154 permits insertion of a wheel pin 150 which can be removably held in place by a flange 157 of one side of bracket 158 and a removable fastener 156 on another side of bracket 158. Fastener 156 may be a wire pin as shown or some other form of removable fastener which can be easily removed by hand during the coupling or uncoupling of trailer 40 from a motor vehicle, or other positioning of trailer 40.

Figure 16:
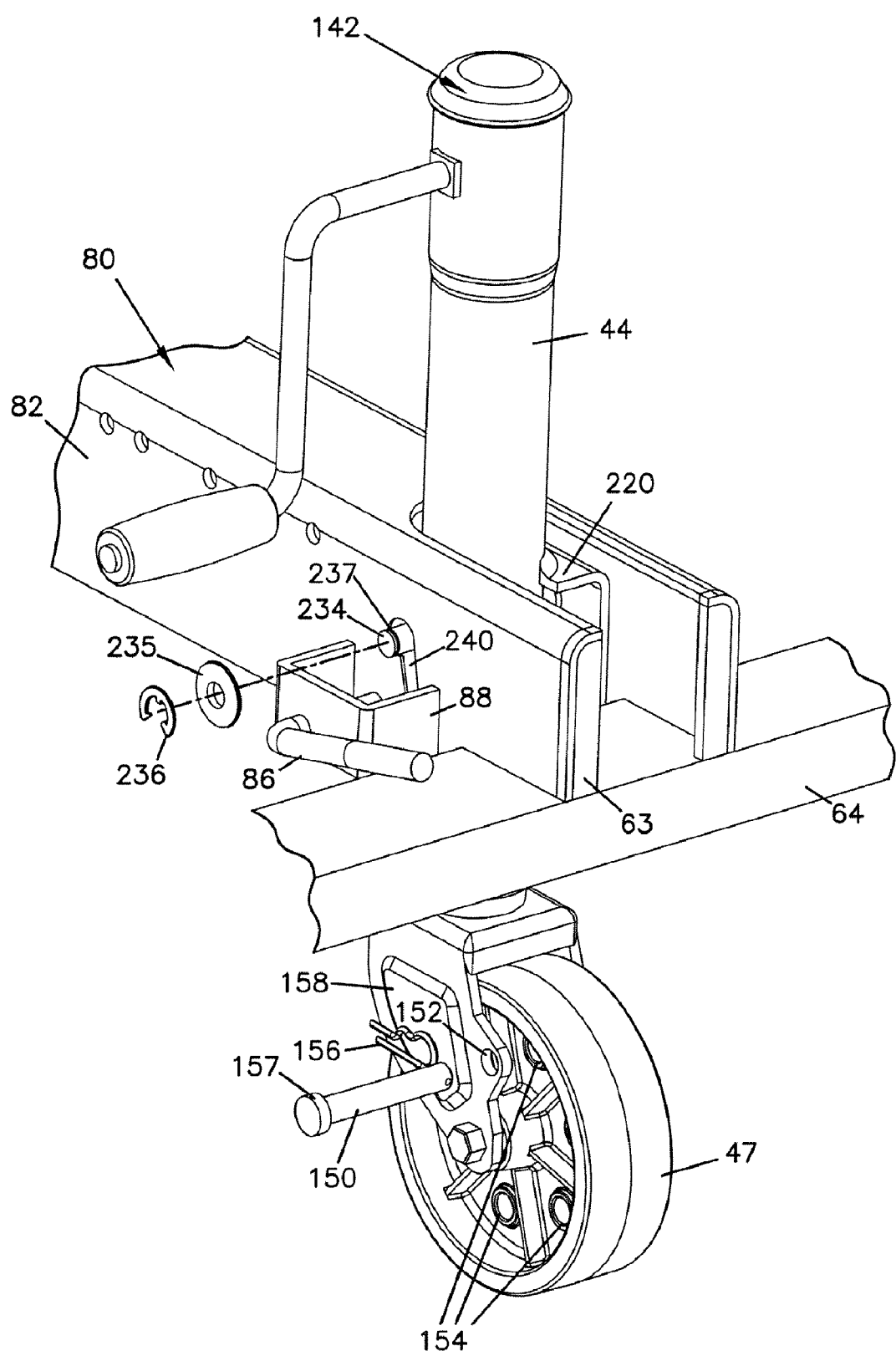
FIG. 16 is a perspective view of a portion of the tongue assembly including the trailer jack of FIG. 14, with a pivot pin restraint arrangement of a second side of the central member exploded.
Figure 17:
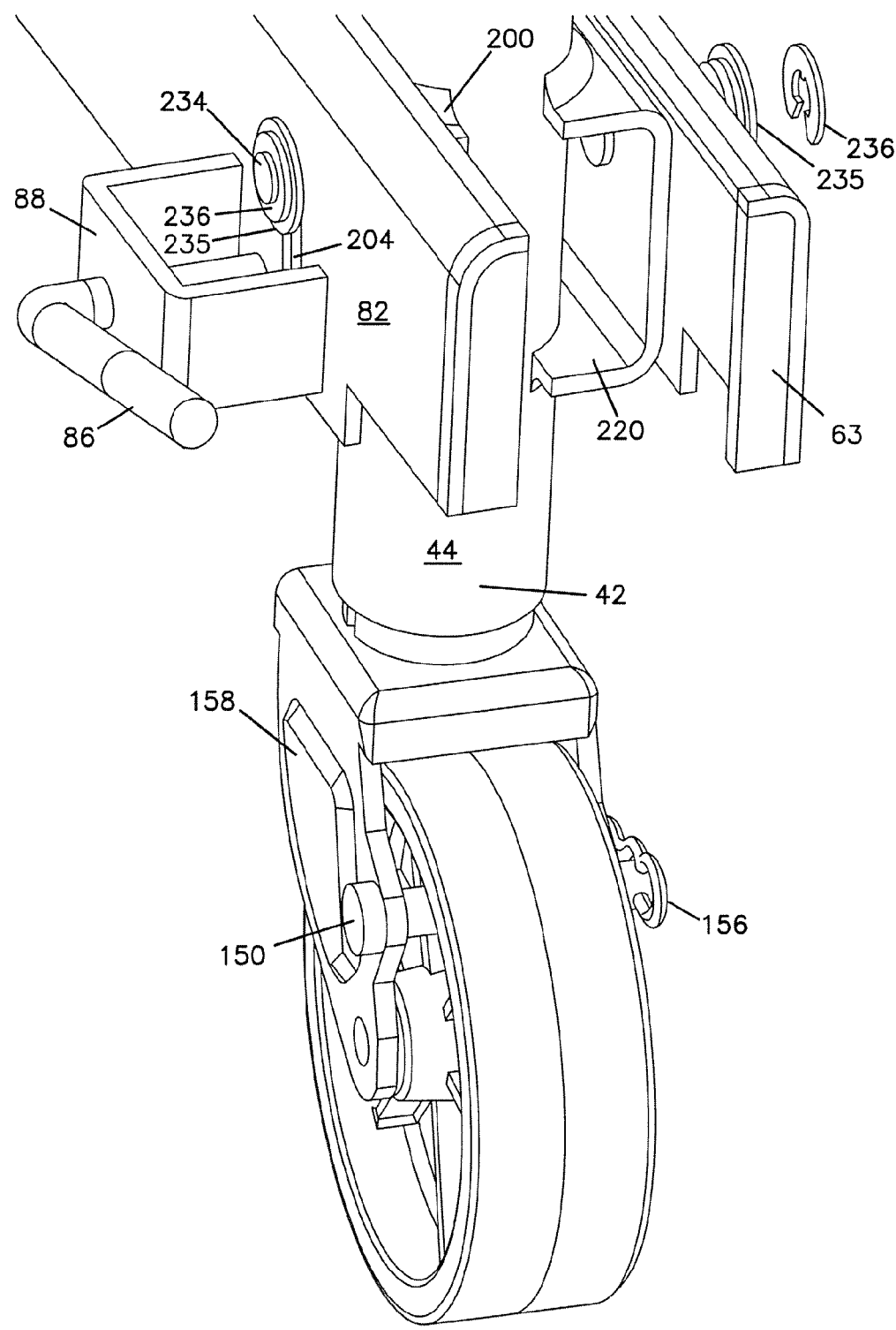
FIG. 17 is a perspective view of a lower portion of the trailer jack mounted to a central member of the tongue assembly of FIG. 15.
Figure 18:
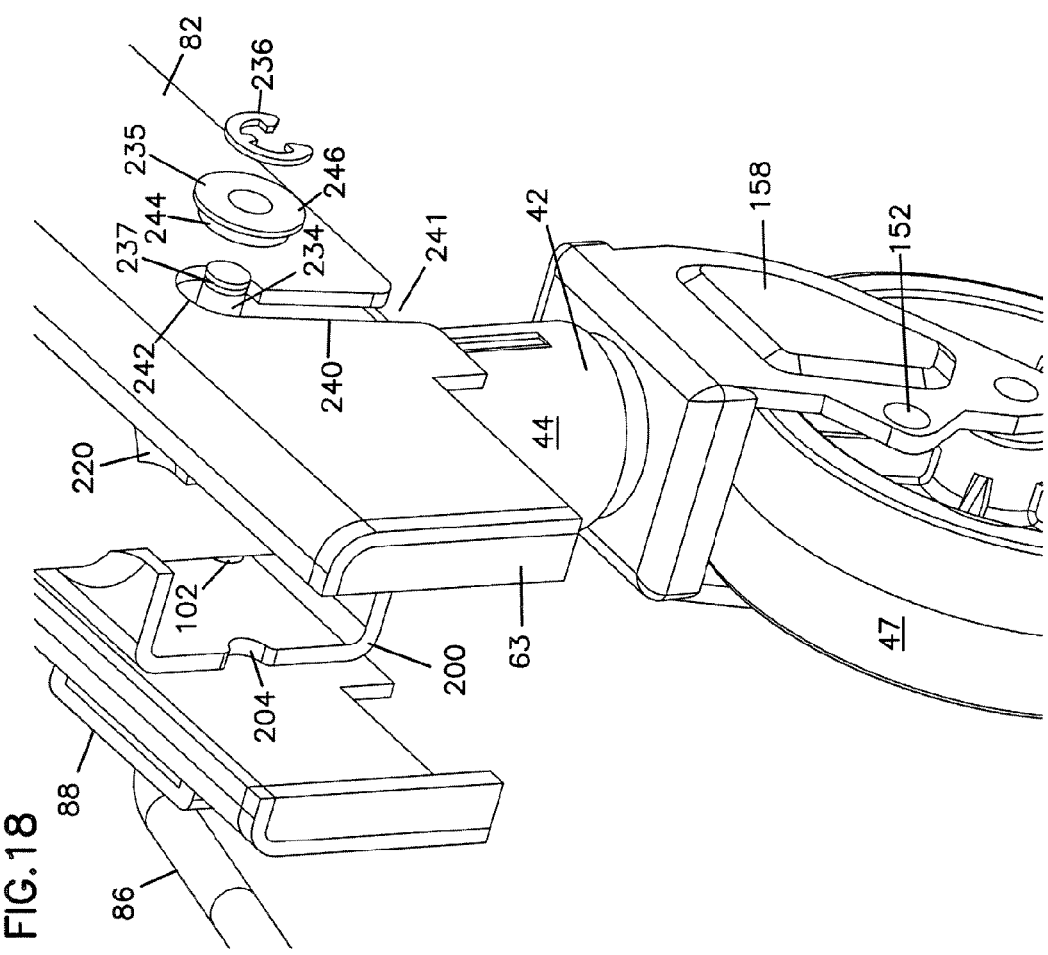
FIG. 18 is a second perspective view of the lower portion of the trailer jack of FIG. 15.

Referring now to FIGS. 16, 17 and 18, pin 234 includes a circumferential groove 237 adjacent an outer end of the pin extending beyond central member 82. Central member 82 includes a pin opening 240 with a first flared end 241 allowing entry of pin 234. Opposite first end 241 of opening 240 is a second enlarged end 242. Extending between the first and second ends of opening 240 is a narrower portion 243. Two-step washer 235 includes a first diameter portion 244 and a second larger diameter portion 246. First diameter portion 244 is sized to fit within enlarged end 242 of opening 240 but is greater in diameter than the width of narrower portion 243. Second diameter portion 246 of washer 235 is greater in diameter than second end 242 of opening 240. To mount trailer support 142 to central member 82, pins 234 are positioned within first ends 241 of openings 240 and moved through narrower portions 243 to second ends 242. Washer 235 is positioned about pin 234 so that first diameter portion 244 fits within second end 242 and second diameter portion 246 is flush against an outer surface of central member 82. Groove 237 of each pin 234 receives and retains a circlip 236 outboard of washer 235. Circlip 236 prevents first diameter portion 244 from being withdrawn from second end 242, thus capturing pins 234 within second end 242 of opening 240.

Figure 19:
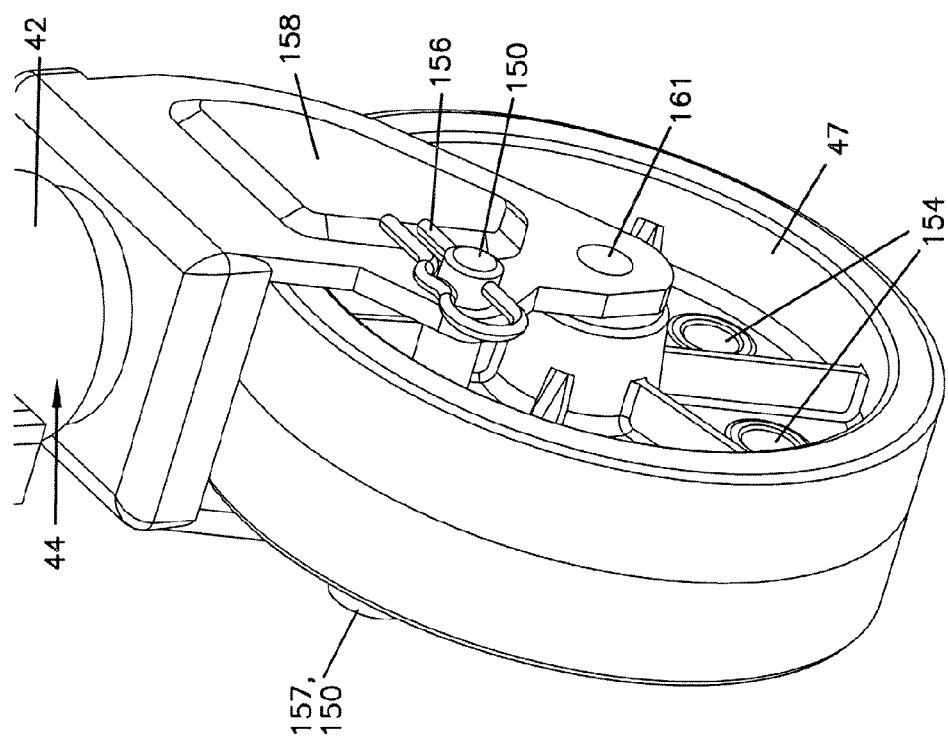
FIG. 19 is a perspective view of the caster wheel and lower portion of the trailer jack of FIG. 14, with the pin inserted through the caster wheel.

Referring now to FIG. 19, wheel 47 is shown with pin 150 positioned within openings 152 of bracket 158 and one of the openings 154 of wheel 47. Fastener 156 is inserted through pin 150 and cooperates with flange 157 to hold pin 150 in place and prevent rotation of wheel 47 about axis 161.

Figure 21:
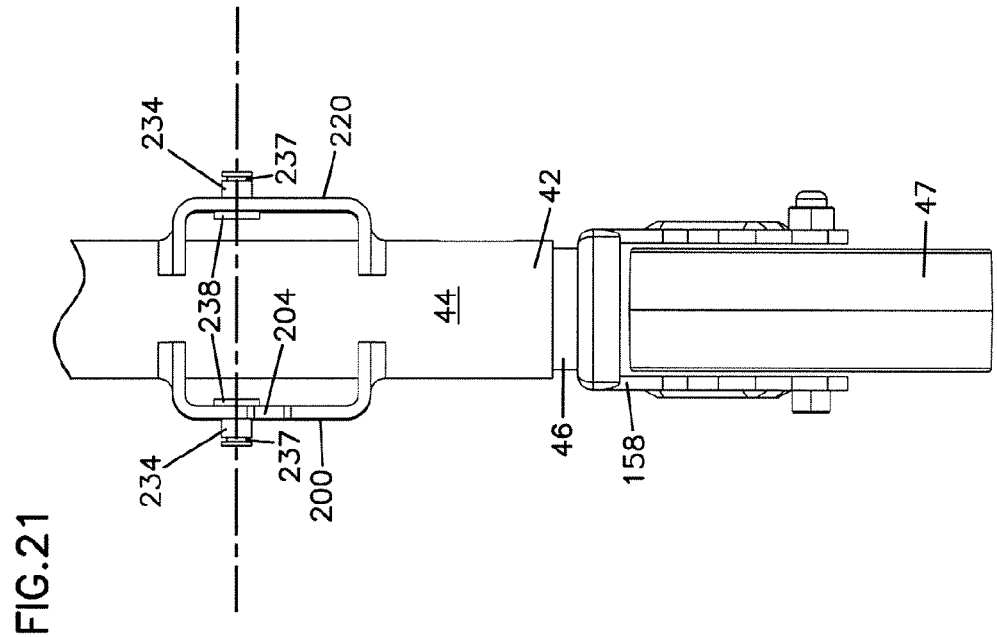
FIG. 21 is a rear view of the trailer jack of FIG. 14 removed from the tongue assembly.
Figure 20:
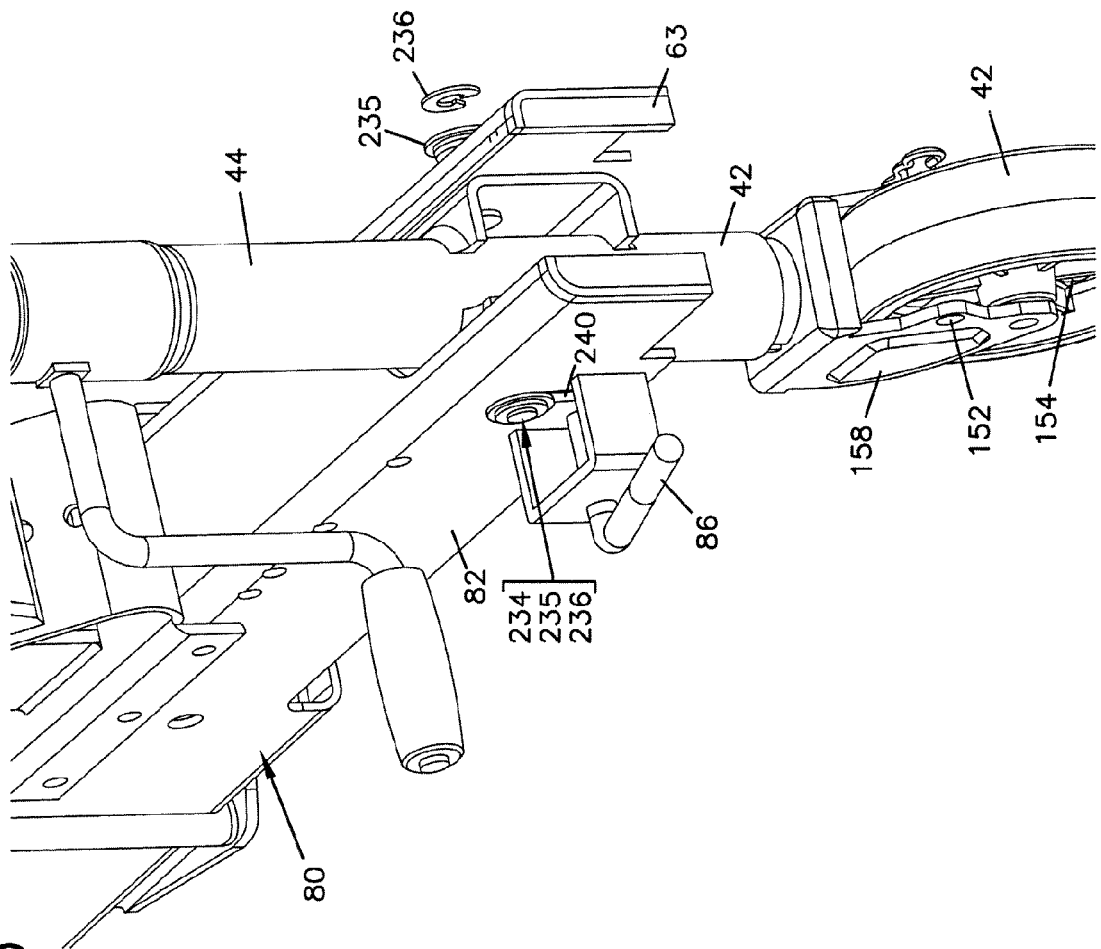
FIG. 20 is a perspective view of a rear of the central member of the tongue assembly of FIG. 14, with the caster wheel pin removed.

Referring now to FIG. 21, pins 234 cooperate to define an axis of pivot for movement of trailer support between the stowed and support positions.

Figure 23:
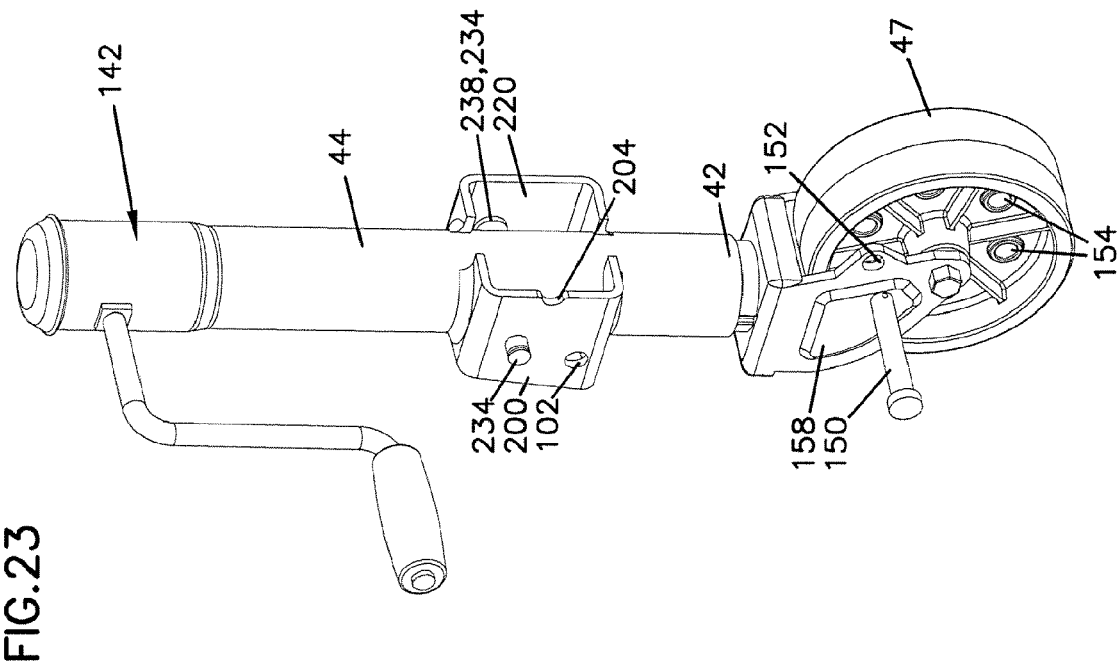
FIG. 23 is a second perspective view of the trailer jack of FIG. 21 with the caster wheel pin in place for insertion through the caster wheel.
Figure 22:
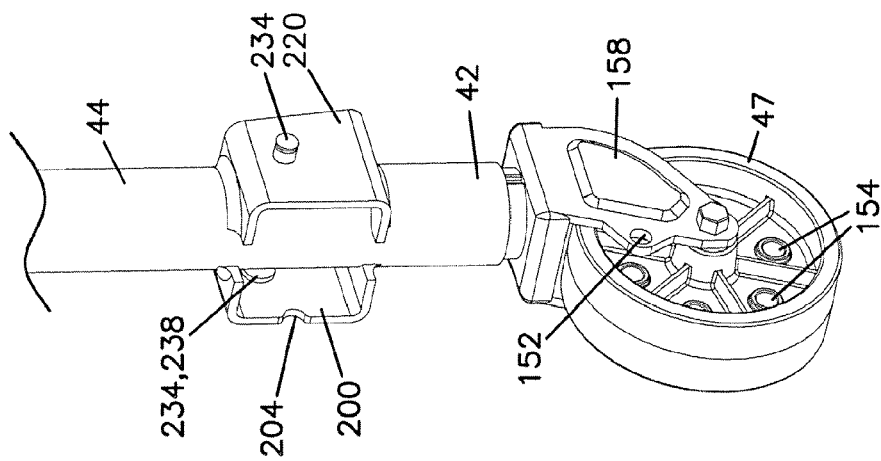
FIG. 22 is a perspective view of the trailerjack of FIG. 21.

Referring now to FIGS. 22 and 23, similar to trailer jack 42, trailer support 142 is releasably held in either the support and stowed positions A, B, by latch 86 engaging openings 102 and 204, respectively, in a bracket 200. Openings 102 and 204 of bracket 200 are offset from the positions of openings 102 and 104 of bracket 100. However, the relative location of opening 102 with respect to opening 204 and pin 234 of bracket 200 is generally the same as the relative location of opening 102 with respect to opening 104 and opening 130 of bracket 100. Both jack 42 and trailer support 142 pivot approximately one-quarter turn about the axis of pivot between the stowed and support positions. Other arrangements of openings to receive latch 86 and releasably hold the trailer support or jack in the stowed and support positions should be appreciated as within the scope of the present inventive concept.

Jack 42 and trailer support 142 are shown as including a retractable sliding inner and outer sleeve arrangement to permit the height of support of the front of the trailer to be varied and to have the jack or support be collapsed as compactly as possible for storage and transport. Alternatively, trailer supports with fixed heights may be adapted for use with the present inventive concept, and other arrangements for adjusting the height of the trailer support are anticipated. Trailer supports with different caster wheel arrangements are anticipated, as are trailer supports with no provision for a caster wheel mounted to the lower end.

While the above description shows and relates specifically to trailers adapted for transporting boats, the present inventive concept may be used for trailers adapted for transporting other types of objects.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A trailer for towing behind a motor vehicle, the trailer comprising:
   a tongue assembly at a front end of the trailer, the tongue assembly including a coupler for coupling to the motor vehicle and a hollow central member extending longitudinally along a center line of the trailer from the coupler toward a rear of the trailer, the central member having a second end opposite the coupler;
   a port beam and a starboard beam extending longitudinally between the tongue assembly and the rear of the trailer, the port and starboard beams including forward ends connected to the tongue assembly at point forward from the second end of the central member;
   at least one pair of wheels supporting the rear of the trailer;
   a crossbeam extending transversely between the port and starboard beams and connected to the second end of the central member;
   a trailer support mounted within the central member between the crossbeam and the forward ends of the port and starboard beams, the trailer support pivotable between a generally vertical support engaging the ground to support the front of the trailer, and a generally horizontal stowed position within the central member;

wherein a lower end of the trailer support includes a bracket having a rotational axis for rotational mounting a support wheel to engage the ground in the support position, wherein the bracket comprises opposing pair of openings for receiving a pin, the support wheel includes at least one wheel rotational preventing opening configured so that the pin engages the rotational preventing opening when received within the opposing openings in the bracket.

2. The trailer of claim 1, wherein the trailer support is extendable to adjust the height above the ground at the front of the trailer will be supported in the support position and retractable to reduce the length of the support member in the stowed position.

3. The trailer of claim 2, wherein the trailer support is extendable and retractable by actuation of a rotating jack handle extending from a top end of the support member.

4. The trailer of claim 1, wherein the trailer support is pivotably mounted to the central member by a pair of opposing pins mounted to an outer housing of the trailer support, each pin including an outer end extending through side openings in the central member.

5. The trailer of claim 4, wherein a two-step washer is placed over the outer end of each pin and the two-step washers are removably fastened in place to retain the pins within the side openings of the central member.

6. The trailer of claim 5, wherein the two-step washer is removably fastened to each of the pins by a circlip engaging a circumferential groove adjacent the end of each pin.

7. The trailer of claim 1, wherein the trailer support includes a bracket mounted to a side adjacent a point of rotation of the trailer support and a pin may be inserted transversely through the central member to engage the bracket to lock the trailer support in either of the support and stowed positions.

8. The trailer of claim 7, wherein the pin engaging the bracket is a captive pin biased to engage the bracket and retractable to disengage the bracket and permit movement of the trailer support relative to the central member.

9. A method of attaching a trailer to a tow vehicle comprising:
providing a tow vehicle with a trailer coupling and a trailer with a mating coupling on a tongue assembly at a front of the trailer, the tongue assembly including a central member extending longitudinally along a centerline of the trailer and a trailer support pivotably mounted to the central member, the trailer support in a support position supporting the front of the trailer, the trailer also including a pair of wheels supporting a rear of the trailer, wherein a wheel is mounted within a bracket at a lower end of the trailer support which engages the ground to support the front end of the trailer in the support position;
positioning the trailer coupling of the tow vehicle adjacent the mating coupling of the trailer;
attaching the trailer coupling and the mating coupling; and,
pivoting the trailer support into a stowed position within the central member, wherein the trailer support is pivotably mounted to the central member of the trailer by a pin extending through the central member and the trailer support, with two-step washers about ends of the pin to hold the pin within openings in the central member.

10. The method of claim 9, further providing the trailer support including a bracket and a pin extending through the central member to releasably engage openings in the bracket to lock the trailer support into either of the support and stowed positions.

11. The method of claim 9, wherein the bracket includes a pair of opposing opening on either side of the wheel, the wheel includes at least one opening aligned with the openings of the bracket, the method further comprising positioning a pin through the openings of the bracket and the wheel to prevent rotation of the wheel.

12. A tongue assembly for a detachable motor vehicle trailer, the tongue assembly comprising:
a central member mounted on a centerline of the trailer and including a coupler for connecting the trailer to the motor vehicle, the central member generally square in cross-section;
a trailer jack pivotably mounted to the central member and pivotable between a generally vertical support position and a generally horizontal stowed position wherein the trailer jack is generally contained within the central member, the trailer jack including a pair of brackets adjacent an axis of pivot and a lower end with a caster wheel mounted and at least a portion of the caster wheel is within the central member when the trailer jack is in the stowed position;
the central member including a releasable latch configured to engage a first opening in one of the brackets of the trailer jack and releasably lock the trailer jack in the support position, and engage a second opening of the same bracket and releasably lock the trailer jack in the stowed position within the central member wherein the trailer jack is pivotably mounted to the central member by pins extending through the brackets of the trailer jack and extending through the central member, a two-step washer positioned about the pins to hold the pins within openings in the central member, and the pins each including a groove beyond the two-step washer with a circlip in the groove to hold the two-step washer within the opening of the central member.

13. A method of uncoupling a trailer from a motor vehicle comprising:
providing the trailer including a tongue assembly with a coupler, the coupler attached to the motor vehicle, the coupler mounted to a central member of the trailer extending rearward along a centerline of the trailer and including a trailer support pivotably mounted within the central member in a stowed position, wherein a wheel is mounted within a bracket at a lower end of the trailer support which engages the ground to support the front end of the trailer in a support position, wherein the bracket has a rotational axis for rotational mounting the wheel and includes an opposing pair of openings for receiving a pin, wherein the wheel includes at least one wheel rotation preventing opening configured so that the pin engages the rotation preventing opening when received within the opposing openings in the bracket to prevent rotation of the wheel about the axis;
maneuvering the trailer to a desired location;
pivoting the trailer support to the support position;
uncoupling the coupler of the trailer from the motor vehicle and resting a front of the trailer on the trailer support.

14. A trailer for towing behind a motor vehicle comprising:
an outer frame defining left and right boundaries of the trailer;

a front including a coupler for attaching the trailer to the motor vehicle;

a rear including a pair of wheels;

a central member extending rearward between the left and right boundaries of the outer frame, the central member including left and right side walls and a top wall that define a stow compartment, the central member also including an open top region;

a trailer support pivotably mounted to the central member and pivotable between a generally horizontal stowed position and a generally vertical support position;

wherein when the trailer support is in the generally vertical support position, an upper portion of the trailer support projects upwardly through the open top region of the central member, and wherein when the trailer support is in the generally horizontal stowed position, at least an intermediate portion of the trailer support is housed within the stow compartment.

15. A trailer for towing behind a motor vehicle, the trailer comprising:

an outer frame defining left and right boundaries of the trailer;

a front including a coupler for attaching the trailer to the motor vehicle;

a rear including a pair of wheels;

a central member extending rearward between the left and right boundaries of the outer frame, the central member including left and right side walls and a top wall that define a stow compartment, the central member also including an open end, and the top wall of the central member defining an open notch extending to the open end of the central member;

a trailer support pivotably mounted to the central member and pivotable between a generally horizontal stowed position and a generally vertical support position;

wherein, when the trailer support is in the generally vertical support position, an upper portion of the trailer support projects upwardly through the notch of the top wall of the central member, and wherein, when the trailer support is in the generally horizontal stowed position, at least an intermediate portion of the trailer support is housed within the stow compartment, and the upper portion of the trailer support projects outwardly from the open end of the central member.

* * * * *